(12) United States Patent
Collins et al.

(10) Patent No.: US 7,992,148 B2
(45) Date of Patent: Aug. 2, 2011

(54) ISSUING SYNCPOINTS DURING EXECUTION OF A BATCH APPLICATION TO MINIMIZE OR ELIMINATE PERIODS OF RECORD UNAVAILABILITY DUE TO BATCH RELATED RECORD LOCKING

(75) Inventors: Bryan Peter Collins, Salisbury (GB); Graeme Denis McRobert, Awbridge (GB); Arthur James Neil, Colden Common (GB)

(73) Assignee: International Business Machines Corporation, Armonk, NY (US)

( * ) Notice: Subject to any disclaimer, the term of this patent is extended or adjusted under 35 U.S.C. 154(b) by 983 days.

(21) Appl. No.: 11/858,452

(22) Filed: Sep. 20, 2007

(65) Prior Publication Data

US 2008/0120618 A1 May 22, 2008

(30) Foreign Application Priority Data

Nov. 22, 2006 (GB) .................................. 0623237.5

(51) Int. Cl.
*G06F 9/46* (2006.01)
(52) U.S. Cl. ...................................................... 718/101
(58) Field of Classification Search .................. 718/101
See application file for complete search history.

(56) References Cited

U.S. PATENT DOCUMENTS

| 5,465,328 A * | 11/1995 | Dievendorff et al. ........... 714/15 |
| 6,542,883 B1 * | 4/2003 | Salo ....................................... 1/1 |
| 6,874,010 B1 * | 3/2005 | Sargent .......................... 709/203 |
| 2006/0156313 A1 * | 7/2006 | Hambrick et al. ............. 719/315 |
| 2007/0088970 A1 * | 4/2007 | Buxton et al. ..................... 714/2 |

* cited by examiner

Primary Examiner — Meng A An
Assistant Examiner — Wissam Rashid
(74) Attorney, Agent, or Firm — Patents On Demand, P.A.; Brian K. Buchheit; Scott M. Garrett

(57) ABSTRACT

The present invention discloses a solution that automatically decomposes a batch process into multiple units of work without changing code of a pre-existing batch application. In the solution, the batch application is first analyzed to identify a set of processing segments or units of work, where each unit of work is of a size that minimizes interference with other data accesses. Once each unit of work is defined, these units can execute one at a time. A syncpoint can be established for each unit before it is executed, which locks the records included in the unit. After the unit of work executes, the record lock can be released and a new syncpoint can be established for the next unit. If an execution problem occurs, execution for the unit of work can be terminated and chances can be restored to the syncpoint.

14 Claims, 4 Drawing Sheets

ISSUING SYNCPOINTS DURING EXECUTION OF A BATCH APPLICATION TO MINIMIZE OR ELIMINATE PERIODS OF RECORD UNAVAILABILITY DUE TO BATCH RELATED RECORD LOCKING

CROSS-REFERENCE TO RELATED APPLICATIONS

This application claims the benefit of British Patent Application No. 0623237.5 filed 22 Nov. 2006 and which is hereby incorporated by reference.

BACKGROUND

1. Field of the Invention

The present invention relates to the field of data processing and database technologies, and, more specifically, to issuing syncpoints during the execution of a batch application.

2. Description of the Related Art

In very complex data processing systems such as global banking networks run on mainframe systems, a transaction processing system (e.g., Customer Information Control System (CICS) from IBM) manages the interface between application programs and database records. If an application wishes to access a record (i.e., a customer's bank account balance stored on a database), then the transaction processing system will mediate the transaction. The transaction processing system will recall the record from the database, and will place a lock on the record so that no other application can access or update that specific record. Any read or write data requests relating to the record are then processed. Once the application program has finished with the record, a syncpoint is issued to the transaction processing system which results in the lock being removed from the record. No other application can access the record while the lock exists.

In addition to application programs accessing records via a transaction processing system, batch applications are also used to update records. A batch application executes a set of updates which can include very large sets that can consume computing resources of transaction processing systems for an execution period. In the context of a banking system, a batch application may relate to a series of over the counter transactions that need to be applied to the computerized records representing the various bank account details of the customers.

Conventional transaction processing systems impose a lock on all batch records while the batch is processing. Locking the records to prevent other applications from accessing or manipulating the locked records permits the systems to "roll-back" batch manipulations whenever a batch execution fails or whenever an authorized administrator wishes to cancel or reverse an active batch process for any reason. The roll-back removes all changes occurring after the syncpoint so that a data processing system state and record content is the same as it was when the syncpoint was established.

In other words, before a batch application is started, a syncpoint is established. Once a batch application is started, each update is processed in turn. This involves accessing each record to be updated, locking the record and then performing the necessary update. Once all of the records referred to in a batch application have been processed, then a new syncpoint can be issued and all of the locked records can be unlocked and therefore made available to other applications. If a problem occurs during the batch, the pre-batch syncpoint can be used to reverse changes resulting from the aborted batch execution.

Historically, batch processes were executed at times when real-time updates were disallowed. For example, real-time updates occurred during workday hours and batch processes were executed at night when no real-time accesses occurred. Consequently, batch applications did not interfere with other processing since a system could be taken "offline" during a time in which real-time accesses are blocked. All batch applications could be executed at this time. However, with the globalization of markets, integration of databases with remote computing systems, data center consolidation, Web database access capabilities for users (i.e., online banking), remote workplace software tools (e.g., CITRIX, PCANYWHERE, etc.), flexible work hours, and other factors have minimized or eliminated acceptable times for placing a system offline. That is, today's database systems often need to be available for real-time accesses twenty four hours a day. Any downtime can result in significant loss of service to key customers, and/or a loss of revenue to a data processing system owner.

Businesses wish to achieve this capability without expensive changes to their data processing infrastructure. For example, businesses do not wish to replace or re-code batch processing applications which are working properly, yet which have an unfortunate side effect of preventing database access when executing. At the same time, businesses are compelled to provide competitive services which can include 24/7 Internet access to customer records and/or data availability to business partners and their computing systems at all times.

No solutions without significant drawbacks currently exist for handling batch processing while providing increased data availability. For example, data processing centers have implemented partial solutions that are mainly based on tools that minimize the impact of the unavailability of data: either by careful scheduling or by limiting either the scope (i.e., number of data sets included in a batch) of batch related "outages" or their duration. The inadequate solutions that do exist often limit the ability of users to stay current and adopt new technologies since the partial solutions impose limitations that conflict with implementation requirements of emerging technologies, system upgrades, and new data processing or data interfacing techniques. To date, no solution has attempted to eliminate batch related downtime or outages entirely.

SUMMARY OF THE INVENTION

The present invention discloses a solution that automatically decomposes a batch process into multiple units of work without changing code of a pre-existing batch application. In the solution, the batch application is first analyzed to identify a set of processing segments or units of work, where each unit of work is of a size that minimizes interference with other data accesses. That is, each unit of work is designed so that a set of records involved in the unit of work will be locked for an acceptably low period of time. Configurable parameters and/or automated system monitoring tools can be used to define the acceptable period of record locking, which in turn is used to define a set of records included in each unit of work. Once each unit of work is defined, these units can execute one at a time. A syncpoint can be established for each unit before it is executed, which locks the records included in the unit. After the unit of work executes, the record lock can be released and a new syncpoint can be established for the next unit. If an execution problem occurs, execution for the unit of work can be terminated and changes can be "rolled back" to the syncpoint. Thus, changes made by the terminated execution of the unit can be discarded and restored to a pre-execution state.

The present invention can be implemented in accordance with numerous aspects consistent with the material presented herein. For example, one aspect of the present invention can include a method of increasing database record availability during a batch process execution. In the method, a batch process of a batch application can be identified. The batch process can be associated with a batch set of database records which are accessed by the batch process as the batch process executes. The batch process can be analyzed to determine multiple units-of-work. Each unit-of-work can be associated with a unit set of the database records, wherein the unit set can be a smaller subset of the batch set. A next one of the units-of-work can be determined. A syncpoint can be established for the determined unit-of-work. Records in the unit set associated with the determined unit-of-work can be locked so that applications other than the batch application are unable to modify the records while locked. The records in the unit can be batch processed in accordance with programmatic instructions of the batch application. Upon success of the processing step, the records in the unit set can be unlocked. The method steps can be repeated until each unit-of-work is processed.

Another aspect of the present invention can include a method of operating a data processing system. The method can execute a batch application. The batch application can read one or more inputs from one or more data files, can perform updates on one or more records according to the inputs, and can issue a new syncpoint when each of the updates are completed. The method can monitor the inputs read from the data file. A predefined algorithm can operate based upon the monitored inputs. Output of the predefined algorithm can cause new syncpoints to be periodically issued during the execution of the batch application. Issuing a new syncpoint can commit record updates of a previous partial batch processing step. User intervention can occur whenever syndication feed updates are obtained by the feed reader.

Still another aspect of the present invention can include a data processing system that includes a processing function arranged to execute a batch application. This processing function can execute to reading one or more inputs from one or more data files, to perform updates on one or more records according to the inputs, and to issue a syncpoint when said updates are completed. The processing function can monitor the inputs to operate a predefined algorithm based upon the monitored inputs. A syncpoint can be periodically issued during the execution of the batch application according to an output of the predefined algorithm.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
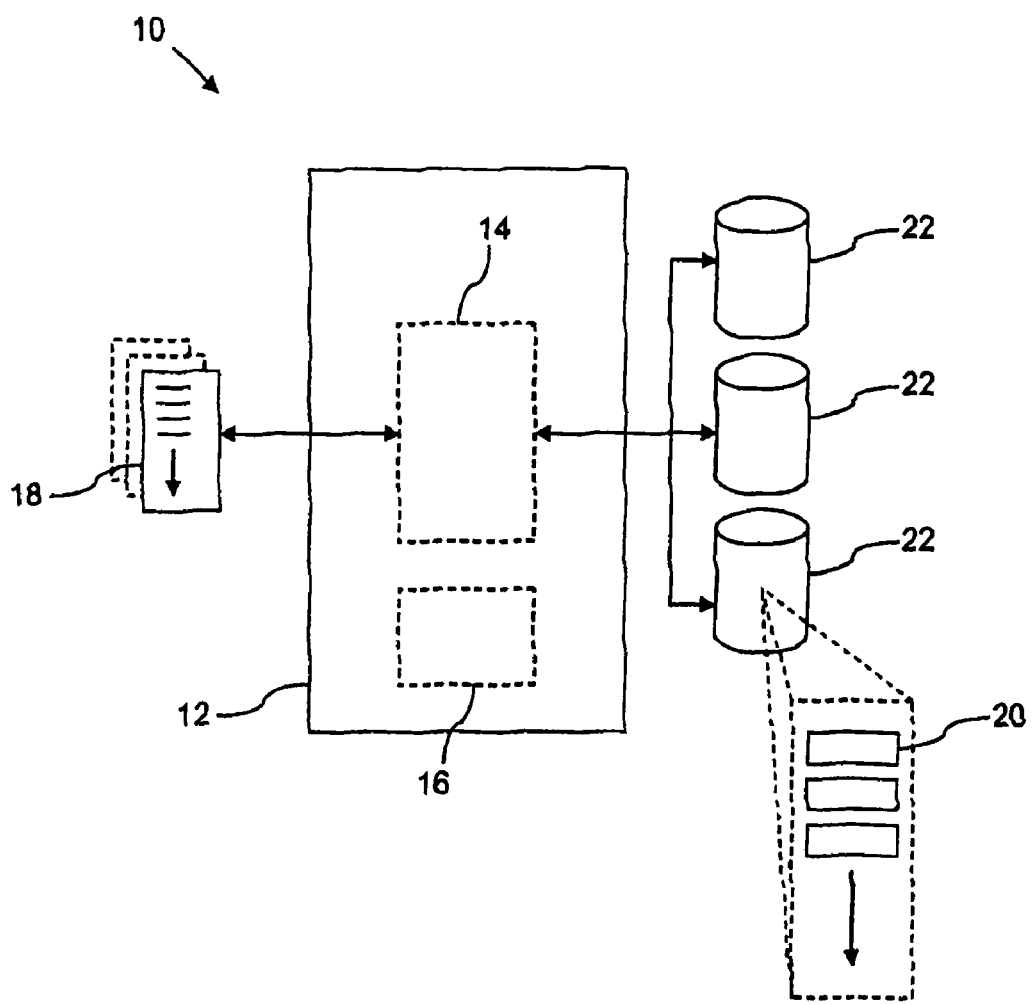
FIG. 1 is a schematic diagram of a data processing system that decomposes a single batch execution into multiple units of work, each having its own syncpoint.

The invention provides a solution permitting transparent file sharing for existing batch applications. The solution allows transaction processing systems (e.g., Customer information Control System (CICS) and batch applications) to make updates to the same records (e.g., Virtual Storage Access Method (VSAM) files) at the same time. The solution provides a mechanism to break up the existing batch applications into multiple units-of-work by issuing syncpoints on behalf of the batch application for each unit-of-work. Each unit-of-work can be processed individually which locks records for that unit only during unit processing. When processing errors occur, the system can restore itself back to the syncpoint associated with the unit, thus restoring system information to a pre-processing state. Thus, unlike traditional batch processes that lock large sets of records during a batch process, the present solution only locks small sets of records at a time. The solution is able to execute batch functions of unmodified batch applications without requiring a processing system to enter an online state.

More specifically, many batch application systems read input from one or more very large sequential files. The batch application processes the data from a set of these input records and then performs an update or multiple updates to a set of records. Appropriately, at that point a syncpoint would be issued because a set of logically connected updates has been performed. The data processing system can base the positioning of syncpoints on information in the records in the sequential input files that are input to the batch application. For example, in one situation each record in a sequential input file will start a new unit of work. Alternatively, batches of records in the input file are processed as a single unit of work in the batch application. A user would have the capability of influencing which records in the input stream would signal that a new unit of work is starting.

Another way in which the system may decide on the issuing of syncpoints is that there might be, in a particular application, a certain fixed number of input records that would be processed as a single unit of work. If that number were one, then the system would know that each record read from the input stream would be starting a new unit of work. Not only would each update be starting a new unit of work, it would be terminating the previous unit of work. Thus this would be an appropriate place to take a syncpoint.

In a different system, each unit of work would process, for example, four input records. The data processing system would then count the input records and when the fifth input record is read the system would know that a new unit of work was starting and the old unit of work was finished and the system would issue a syncpoint. In other cases, certain data in an input record might signify the start of a new unit of work. for example, when byte 1 of a record contains 'S', then that might indicate the start of a new unit of work. Thus every time the batch application reads a record with an 'S' in the first byte, the system would note that a new unit of work was starting and the old unit of work had finished and a syncpoint would be issued. The information in the record would already exist but the system provides an interface for the user to tell the system which information to look for in a record update. By these techniques the data processing would be able to issue syncpoints at appropriate points on behalf of the batch application and there would therefore be recoverable data records without any need to change the batch application.

FIG. 1 shows a data processing system 10 which includes a computer 12 which can be a mainframe computer that provides a processing function. The mainframe 12 can include a batch application 14 that can have its own address space within the mainframe 12. The mainframe 12 can also include a transaction processing system 16. The transaction processing system 16 can be any hardware/software/firmware configured to process database records. In one embodiment, the transaction processing system 16 can be a CICS region within the mainframe 12.

When the batch application 14 is being executed, the application 14 communicates with one or more data files 18 and applies updates to records 20 being stored by databases 22. The execution of the batch application 14 comprises reading one or more inputs from the data files 18, performing updates on one or more records 20 according to the inputs read from the data files 18, and ultimately issuing a syncpoint when the updates are completed. As each record 20 is accessed by the batch application 14 during the execution of the batch, then that record 20 is locked until the completion of the batch application 14 where the syncpoint releases the locks on all of the records 20 accessed by the batch application 14. In contrast, system 10 permits the records 20 to be updated while region 16 remains online. System 10 can operate without modifying batch application 14.

In the known conventional arrangement, while the batch application 14 is being executed, the CICS region 16 is not part of the batch process and is either taken offline while the batch application 14 is executing or will be unable to access any records 20 that have had locks placed on them by the batch application 14.

Figure 2:
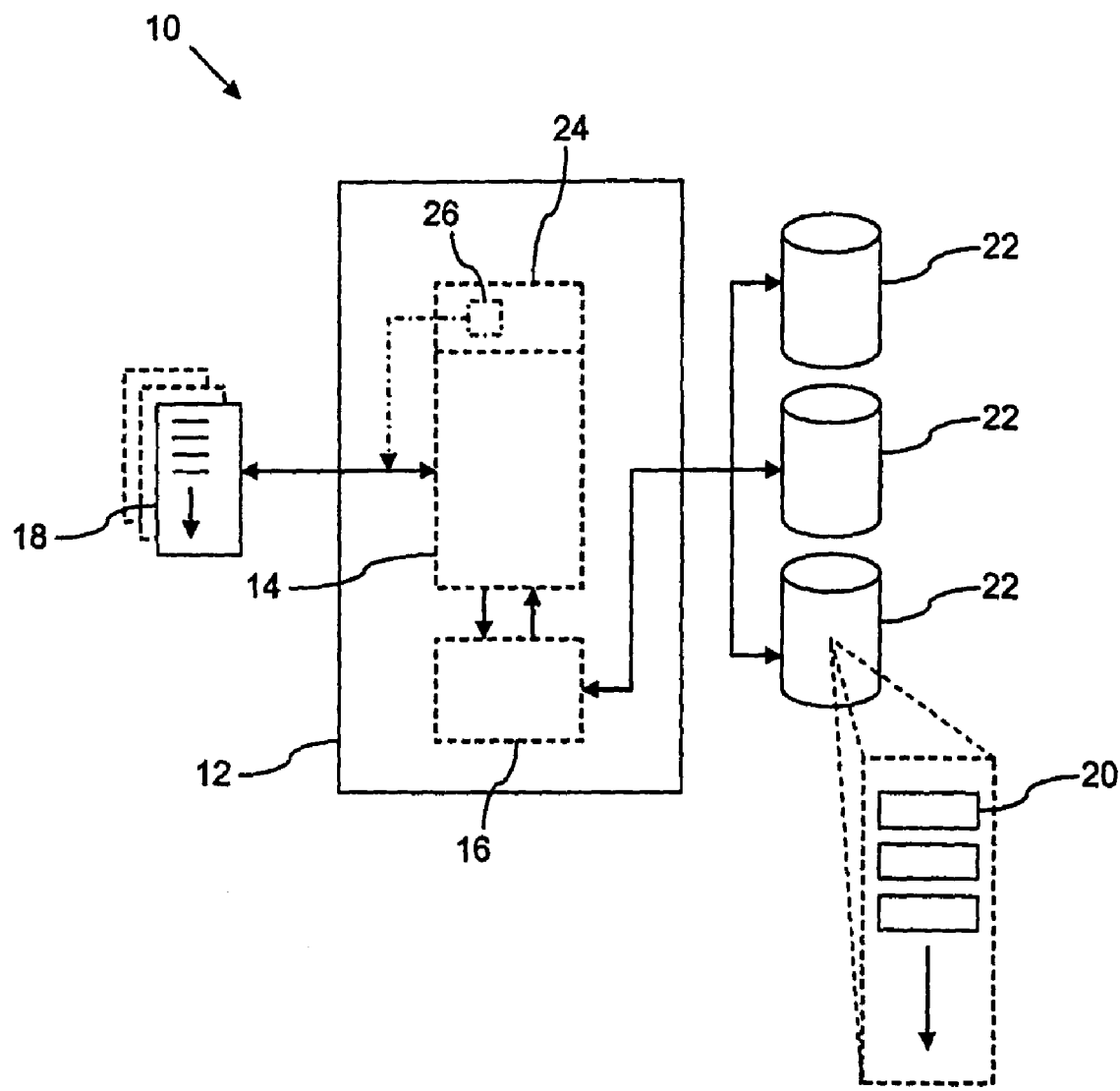
FIG. 2 is a further schematic diagram of the data processing system in accordance with an embodiment of the inventive arrangements disclosed herein.

FIG. 2 shows the data processing system 10 of FIG. 1 adapted according to an embodiment of the invention. An application program 24 is written into the same address space as the batch application 14 (without any amendment needed to the batch application 14). This application program 24 is configured to monitor the inputs read from the data files 18 and operates a predefined algorithm 26 based upon the monitored inputs.

The predefined algorithm 26 can be simple and, for example, can be arranged to generate an output following a fixed number of inputs being read from a data file 18. The data processing system 10 of FIG. 2 is arranged periodically to issue a syncpoint during the execution of the batch application 14, according to the output of the predefined algorithm 26. This is achieved by intercepting data requests from the batch application 14 to the records 20 and routing the intercepted data requests through the transaction processing system 16 (the CICS region). This intercepting of the data requests from the batch application 14 to the records 20 can comprise intercepting internal communications within the batch application 14. In effect, the application program 24 monitors calls within the batch application 14, and internal communications to the output interface of the batch application 14 are intercepted by the program 24 and rerouted through the CICS region 16.

In this configuration, the step of periodically issuing a syncpoint during the execution of the batch application 14, is carried out by the transaction processing system 16. The system of FIG. 2 is arranged, effectively, to break up the batch defined by the data files 18 into a series of much smaller units of work. A syncpoint is issued after each of these smaller units of work is completed. This ensures that large numbers of records 20 are not held by locks and the CICS region 16 can mediate access to records 20 required by other application programs. If CICS receives a data request from another application in respect of a record 20 for which a lock is being applied for the current unit of work that the batch application 14 is processing, then this is handled in the normal manner and CICS will hold that data request until the lock is released.

The algorithm 26 is monitoring the input to the batch application 14 and is defining a break up of the inputs into separate units of work. An output is generated that triggers the issuing of a syncpoint when a unit of work completes, according to the rules of the algorithm 26. The predefined algorithm 26 can be operated to generate an output following detection of a data flag in an input being read from a data file 18. This data flag can be selected by a user, and can be as simple as looking for a stated character at a specific bit position in an input received from the file 18.

Figure 3:
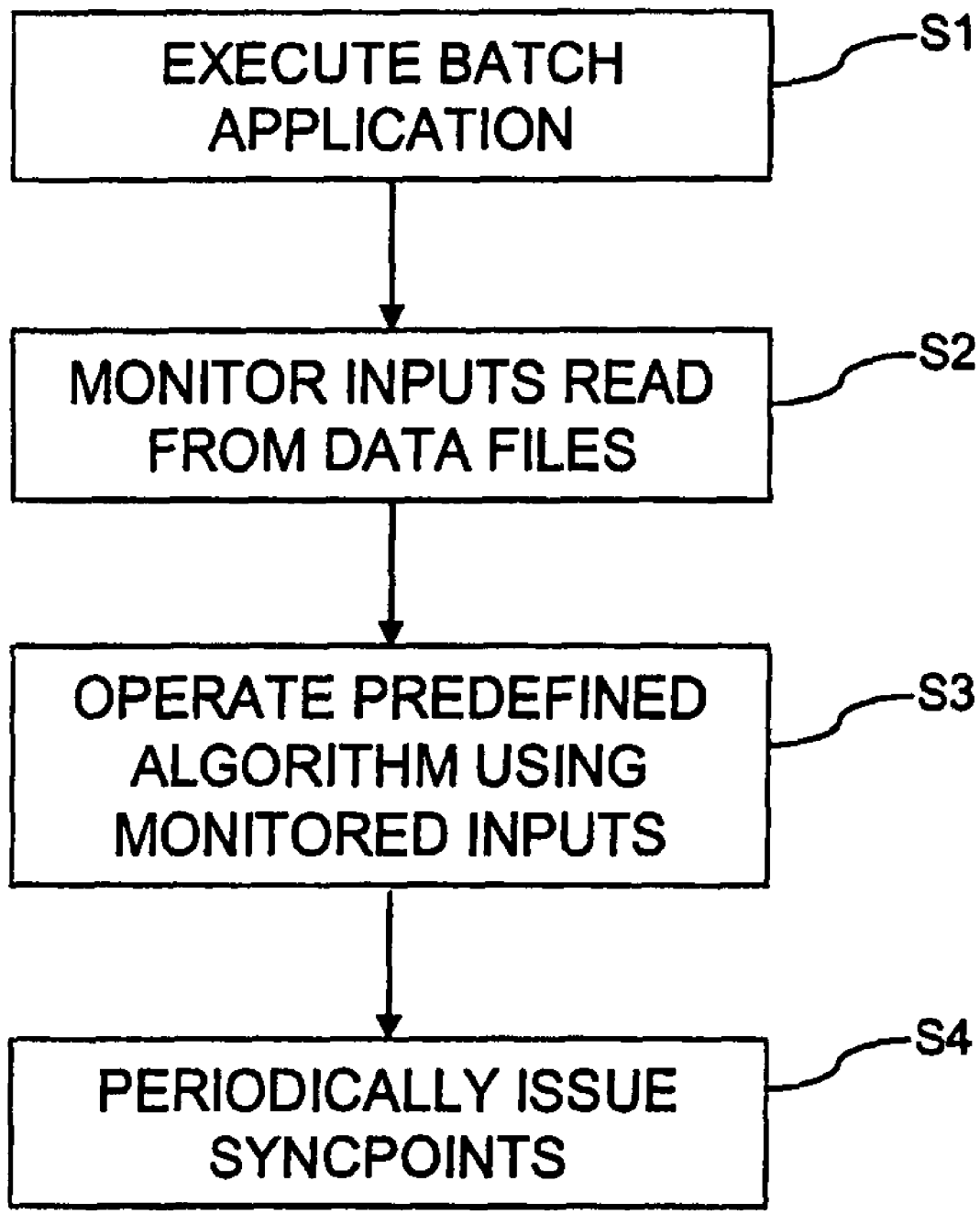
FIG. 3 is a flow diagram of a method of operating a data processing system that decomposes a single batch execution into multiple units of work, each having its own syncpoint.

FIG. 3 summarizes the methodology used in the data processing system 10 of FIG. 2. The method of operating the data processing system 10 comprises the step S1 of executing the batch application 14, the step S2 of monitoring the inputs read from the data files 18, the step S3 of operating the predefined algorithm 26 based upon the monitored inputs, and finally the step S4 of periodically issuing a syncpoint during the execution of the batch application 14, according to an output of the predefined algorithm 26.

Figure 4:
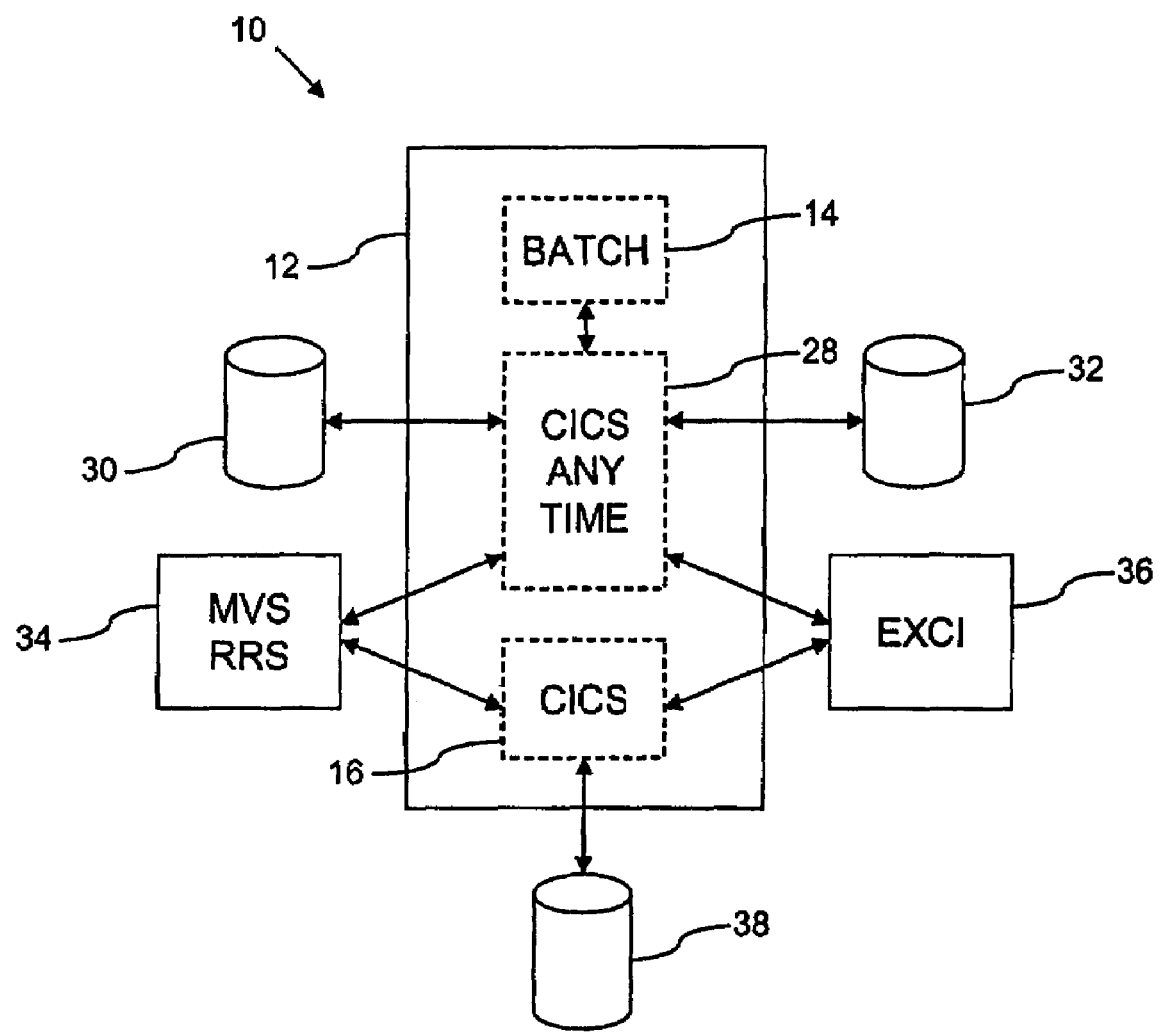
FIG. 4 is a schematic diagram of embodiment of the data processing system in accordance with an embodiment of the inventive arrangements disclosed herein.

FIG. 4 shows another embodiment of the data processing system 10, which uses an application program 28 "CICS Anytime" to mediate between the batch application 14 and the transaction processing system 16, a standard implementation of the CICS. The batch application 14 includes a shared Virtual Storage Access Method (VSAM) file request/response unit which interfaces with CICS Anytime. CICS Anytime is responsible for the issuing of syncpoints, and for restarting (auto and manual) the system and request mapping. CICS Anytime is connected to a restart database 30, a checkpoint database 32, a Multiple Virtual Storage Resource Recovery Services (MVS RRS) unit 34 and an external CICS interface (EXCI) unit 36. CICS connects to the shared records stored as VSAM datasets in a database 38.

The primary objective of CICS Anytime is to eliminate completely CICS application outages caused by the inability of CICS to share its VSAM file data. CICS Anytime enables non-CICS programs to access VSAM file data through CICS, so that CICS appears to treat each batch application 14 as just another transactional user. In return for getting access to CICS's file data on behalf of batch applications, CICS Anytime has to ensure that the client's non-CICS applications are operating as if they were well-designed transactional applications. This requires short duration units of work, changes being hardened when committed, changes able to be backed out upon failure of units of work, the proper handling of error conditions, coordinated with CICS handling, and able to restart from a recent point in time and back out failures, following any catastrophic failure.

CICS Anytime has to be applicable to existing batch applications 14 without requiring them to be modified. Many existing batch applications, by their structure, are unable to operate as well-designed transactional applications. If they were run as is, many batch applications 14 would hold CICS locks for the duration of the batch job, which could be a very long time. This would result in CICS online transactions suffering long delays due to waits for locks, or being aborted due to timeouts or, in the worst case, deadlocks.

Rather than requiring compliance of non-CICS client programs, such as the batch application 14, through redesign, CICS Anytime provides for these applications the infrastructure to achieve compliance. In practice, CICS Anytime takes control by intercepting VSAM requests that the batch applications make, and creating granularity, both in the stream of data requests in normal operation and in the sequence of events in restart and recovery in the event of job or system failure.

This role is crucial when working with unchanged, legacy, batch applications 14. These aged applications 14 are usually unsophisticated, with simple error handling and little, if any, recovery and restart capability. CICS Anytime addresses these problems by issuing syncpoints on behalf of the batch application 14, and tracks and manages status and restart processing in the event of any failure.

In summary, the functions of CICS Anytime include intercepting and redirecting file requests from z/OS batch applications, where the files are being managed by CICS, dynamically splitting up large batch jobs, presenting them to CICS as a series of small units of work, and working with MVS Resource Recovery Services and CICS Recovery Manager to coordinate commitment or rollback of file changes. CICS Anytime also automatically inserts syncpoints at appropriate places in the job stream, with user defined syncpoint frequency by, for example, time or number of updates and can dynamically split up large batch jobs into checkpoint restartable units with user defined checkpoint frequency by, for example, time or number of updates. CICS Anytime can handle communication failures such that they are transparent to the batch applications and do not require a restart, where possible, can ensure back-out of all changes to all shared files to last successful syncpoint, and can provide restart from the last successful checkpoint.

The use of the system of FIG. 4 with the CICS Anytime eliminates the batch window for virtually all batch applications without requiring any batch application code changes, with minimal job control language (JCL) or procedure changes and without having any significant negative impact on CICS transaction response time, service levels or availability.

CICS Anytime operates without having a significant effect on batch application performance. In particular, elapsed time remains acceptable. Depending on the nature of the application there are likely to be user requirements to have certain batch jobs complete within a certain time frame. For example, check clearing has to be completed by a statutory time every day so banks can settle financial positions between themselves. The current quantification of acceptable is no more than a doubling of batch job elapsed time. In this embodiment, the backing up of data files before and after the batch job are no longer required.

The system of FIG. 4 has a mechanism to provide basic file data sharing between multiple MVS address spaces. This is provided by the reuse of CICS file sharing, based on MRO Function Shipping and the CICS mirror transactions. Although this is currently limited to sharing between CICS Address Spaces, the EXCI capability, which provides Distributed Program Link (DPL) between a non-CICS MVS address space and a CICS Server address Space, can be used. The CICS Anytime solution is based on enhancements to EXCI to support shipping of File Control requests.

With a basic file sharing mechanism, the system is able to provide a way to intercept application file requests without requiring any program changes to the batch application 14. This function also maps the VSAM request issued by the batch application 14 to a CICS format that can be shipped by EXCI to the CICS system that owns the files. This must all be done in a way that is transparent to the existing batch application 14, such that it appears to the batch application 14 that the batch application 14 is still accessing a non-shared file under exclusive control.

This means that, for example, new errors that could arise due to the fact that there are new components being used must be handled within CICS Anytime and not exposed to the batch application 14 in any way. Locking is fundamental to a shared environment but is totally absent from the exclusive control environment in which the batch application 14 thinks it is running. Therefore locking, timeouts, and deadly embrace situations all need to be catered for transparency with respect to the batch application 14.

With the capabilities provided above, the system provides a solution which provides transparent file sharing for existing batch jobs. However, with no other changes, the existing batch job would run as a single long running unit-of-work (UOW). This means that the batch job would potentially hold thousands of locks in CICS and the online CICS regions would grind to a halt and potentially fail.

Therefore, there is provided a mechanism to break the existing batch job up into multiple UOWs by issuing syncpoints on behalf of the batch application 14. CICS Anytime has to issue the syncpoints at appropriate places and the syncpoints are handled by MVS Resource Recovery Services unit 34 which acts as the syncpoint coordinator.

The system also needs to provide checkpoint restart and positional recovery. The capabilities described above (of issuing periodic syncpoints) result in a break up of the batch job and stop it having a significant impact on online CICS transaction response times. However, should the batch job fail, there needs to be a mechanism which will allow the system to be restarted either automatically or manually from the point of failure. What is possible is the ability to create restart checkpoints at periodic intervals, not too often (less frequently than the syncpoints mentioned above) as they are expensive to create (Elapsed Time, CPU and I/O) and then to restart from the most recent checkpoint.

The system is running transactionally and therefore CICS will back-out of any uncommitted units of work to the most recent syncpoint in cases of failure. What is provided is the ability for the batch job which is restarted at the most recent checkpoint to "catch-up" with the state of the data as backed out to the most recent syncpoint. This is achieved by use of the Restart Dataset which is created by CICS Anytime and contains a record of all the VSAM requests and responses since the most recent checkpoint.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than foregoing the specification, as indicating the scope of the invention.

What is claimed is:

1. A data processing method comprising:
   executing a batch update of a batch application as a series of discrete update actions, each action comprising:
   (A) reading at least one input from at least one data files,
   (B) performing updates to at least one record according to the input read from the at least one data file, wherein the records upon which the performing step performs updates is a unit set smaller than a batch set of records associated with the batch application, and records of the unit set are locked during the performing step, wherein after a successful completion of the performing step, the unit set of records are unlocked, and
   (C) issuing a syncpoint when said updates are completed, wherein the one syncpoint is used to recover records to a pre-performing step state when an error occurs during the performing step;
   monitoring the inputs read from the at least one data file;
   operating a predefined algorithm based upon the monitored inputs; and
   periodically issuing a syncpoint during the execution of the batch application according to an output of the predefined algorithm, wherein one of the periodically issued syncpoints is associated with the unit set of records and wherein a next one of the periodically issued syncpoints is associated with a next unit set of records to be processed.

2. The method of claim 1, said method further comprising:
   intercepting data requests from the batch application to the records, and routing the intercepted data requests through a transaction processing system.

3. The method of claim 2, said intercepting set further comprising:
   intercepting data requests from the batch application to the records, which comprises intercepting internal communications within the batch application.

4. The method of claim 1, wherein the step of periodically issuing a syncpoint, during the execution of the batch application, is carried out by the transaction processing system.

5. The method of claim 1, wherein said predefined algorithm generates an output following a fixed number of inputs being read from a data file.

6. The method of claim 1, wherein said predefined algorithm generates an output following detection of a data flag in an input being read from a data file.

7. The method of claim 1, wherein said steps of claim 1 are steps performed automatically by at least one machine in accordance with at least one computer program having a plurality of code sections that are executable by the at least one machine, said at least one computer program being stored in a machine readable medium.

8. A data processing system comprising a processing function arranged for executing a batch application, the executing comprising reading at least one input from at least one data file, performing updates on at least one record according to each input read from the at least one data file, wherein the performing step that performs updates is a unit set smaller than a batch set of records associated with the batch application, and records of the unit set are locked during the performing step, and issuing a syncpoint when said updates are completed, wherein the one syncpoint is used to recover records to a pre-performing step state when an error occurs during the performing step, the processing function arranged to monitor the inputs read from the at least one data file, to operate a predefined algorithm based upon the monitored inputs, and to periodically issue a syncpoint during the execution of the batch application according to an output of the predefined algorithm, wherein one of the periodically issued syncpoints is associated with the unit set of records, wherein after a successful completion of the performing step, the unit set of records are unlocked.

9. The system of claim 8, wherein the processing function is further arranged to intercept data requests from the batch application to the records, and the system further comprises a transaction processing system arranged to route the intercepted data requests.

10. A method of increasing database record availability during a batch process execution comprising:
   identifying a batch process of a batch application, wherein the batch process is associated with a batch set of database records, which are accessed by the batch process as the batch process executes;
   analyzing the batch process to determine a plurality of units-of-work, each unit-of-work associated with a unit set of the database records, wherein the unit set of the database records is a smaller subset of the batch set of database records;
   reading a configurable parameter, which determines at least one of a maximum time permitted for a set of records to be locked and a maximum size of a unit set of records, wherein the analyzing step constructs a plurality of units-of-work in accordance with the constraint established by the configurable parameter;
   determining a next one of the units-of-work;
   establishing a syncpoint for the determined unit-of-work;
   locking records in the unit set associated with the determined unit-of-work so that applications other than the batch application are unable to modify the records while locked;
   batch processing the records in the unit set of the database records in accordance with programmatic instructions of the batch application;
   upon success of the processing step, unlocking the records in the unit set of the database records; and
   repeating the determining, establishing, locking, processing, and unlocking steps until each said unit-of-work of the plurality of units-of-work are processed, wherein the batch application is an unmodified batch application, wherein in absence of performing the steps of: identifying the batch process associated with the batch set of database records, accessing said database records by the batch process, analyzing to determine the plurality of unit-of work, determining the next one of the units-of-work, establishing the syncpoint, locking the associated unit set with the determined unit-of-work and unlocking the records in the unit set upon success of the processing step, the unmodified batch application locks the batch set of records when processed.

11. The method of claim 10, further comprising:
upon a lack of success of the processing step, rescinding changes resulting from the processing step by reverting to a state marked by the established syncpoint; and
re-executing the batch processing step for the records in the unit.

12. The method of claim 10, wherein the steps of claim 10 are performed by a transaction processing system in accordance with a set of machine readable instructions stored in a machine readable medium.

13. The method of claim 10, wherein the steps of claim 10 are executed when the database records of the batch set are online and available for database purposes other than the batch process.

14. The method of claim 10, wherein said steps of claim 10 are steps performed automatically by at least one machine in accordance with at least one computer program having a plurality of code sections that are executable by the at least one machine, said at least one computer program being stored in a machine readable medium.

* * * * *